UNITED STATES PATENT OFFICE.

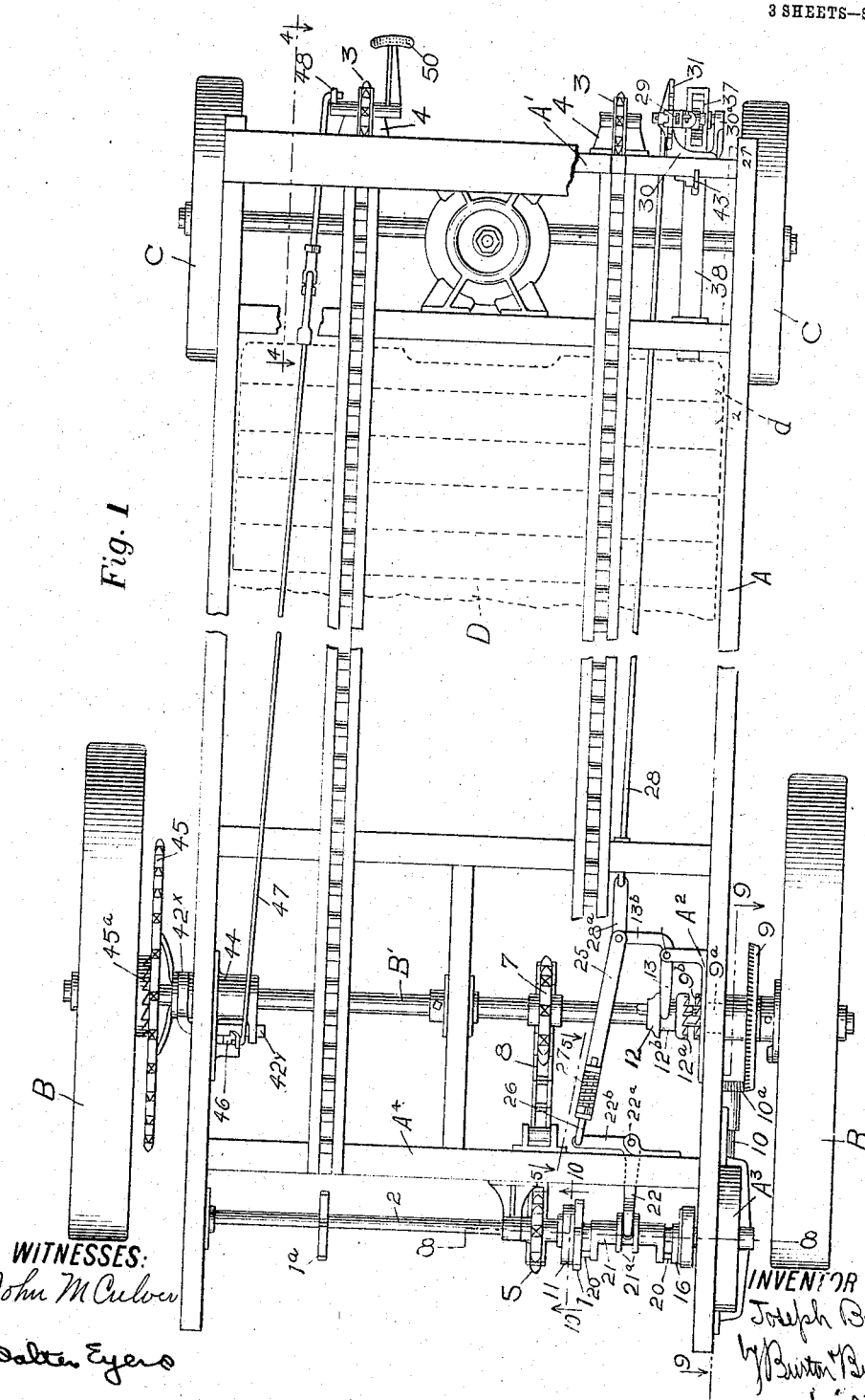

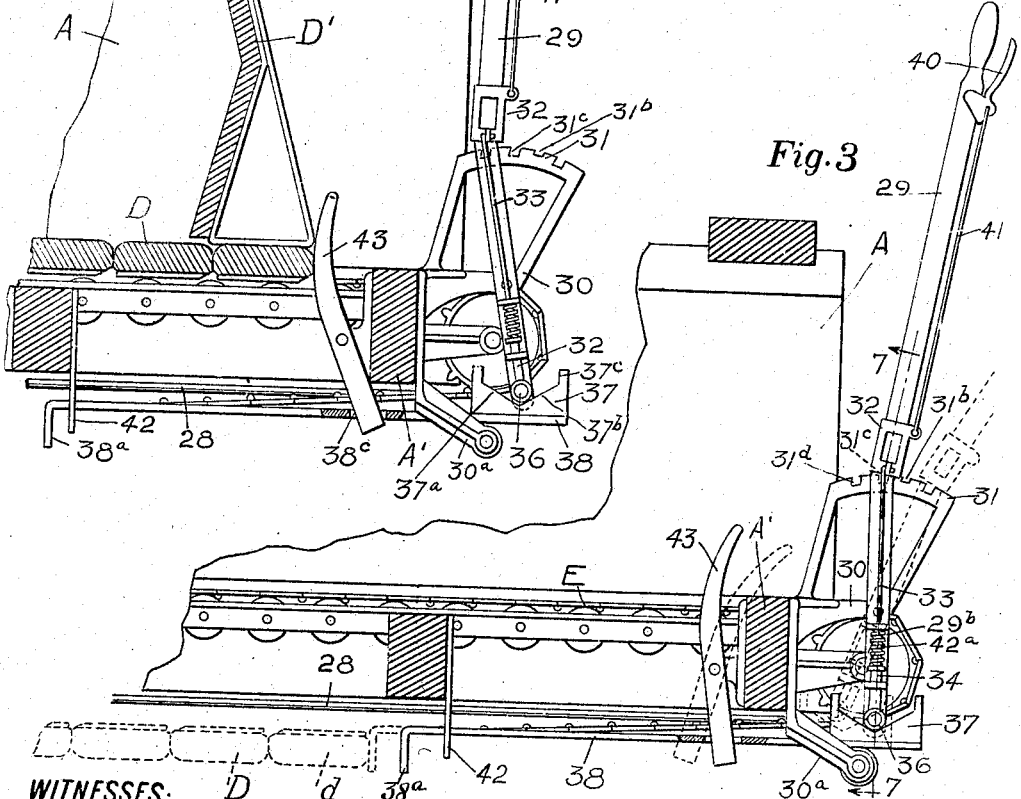

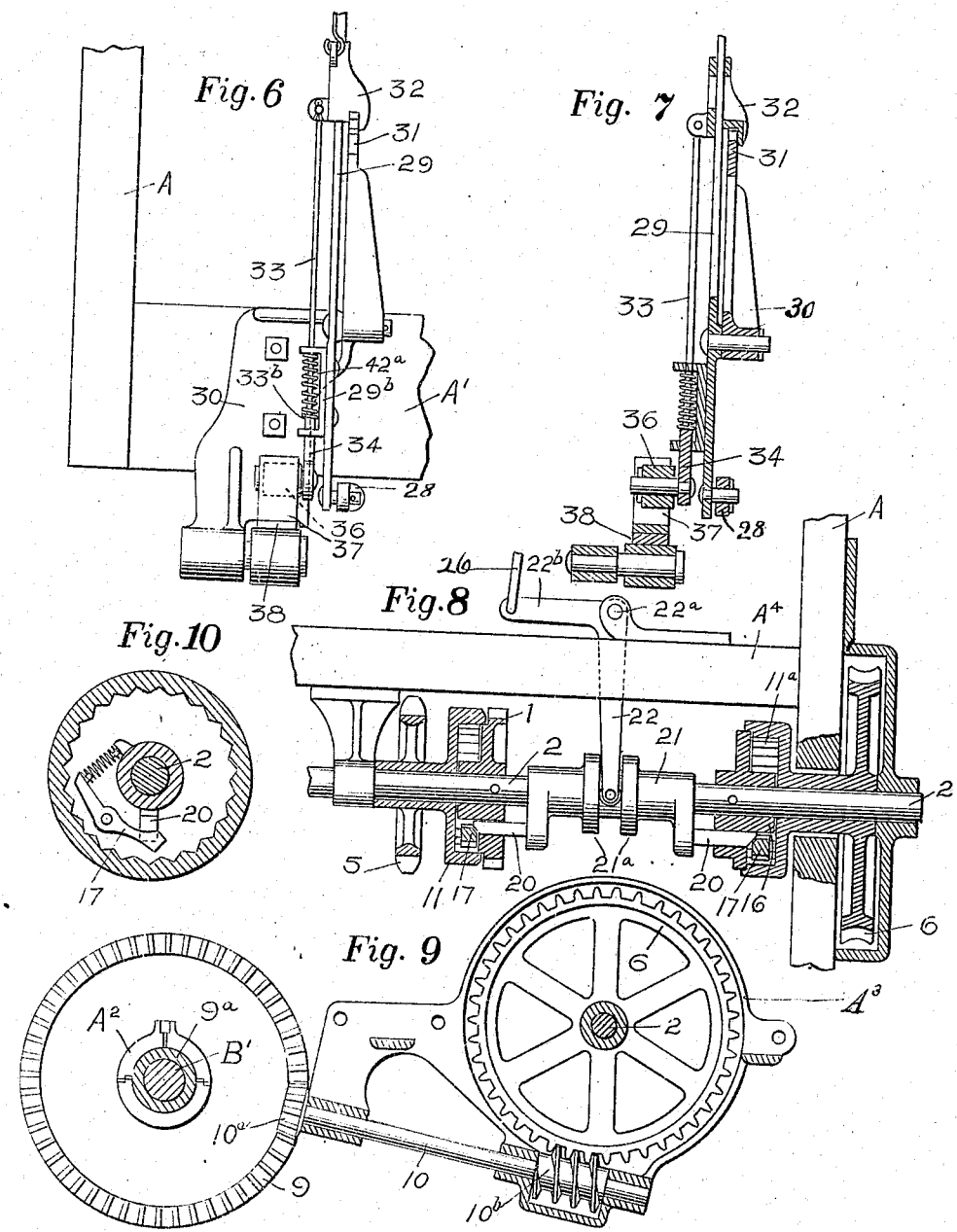

JOSEPH BODA, OF PLANO, ILLINOIS, ASSIGNOR TO INDEPENDENT HARVESTER COMPANY, OF PLANO, ILLINOIS, A CORPORATION OF MAINE.

CLUTCH-SHIFTING MECHANISM FOR FERTILIZER-DISTRIBUTERS, &c.

No. 930,456.   Specification of Letters Patent.   Patented Aug. 10, 1909.

Application filed August 19, 1908. Serial No. 449,229.

*To all whom it may concern:*

Be it known that I, JOSEPH BODA, a citizen of the United States, residing at Plano, in the county of Kendall and State of Illinois, have invented new and useful Improvements in Clutch-Shifting Mechanism for Fertilizer-Distributers and the Like, of which the following is a specification, reference being had to the drawings forming a part thereof.

The purpose of this invention is to provide an improved mechanism, particularly adapted for use in such a structure as a fertilizer distributer, for controlling the connection of the driving mechanism with the conveyer and distributer.

It consists in the elements and features of construction and other combinations shown and described as indicated in the claims.

In the drawings:—Figure 1 is a plan view of a fertilizer distributer involving this invention with the conveyer and distributer removed, a portion of the former being shown in dotted line. Fig. 2 is a section at the line 2—2 on Fig. 1, showing the parts in the position occupied at the close of the return forward movement of the conveyer before the operating train had been tripped out of action. Fig. 3 is a view similar to Fig. 2 showing in full line the parts in position at the close of the rearward or delivering movement of the conveyer, and showing in dotted line certain parts at the position occupied just before the tripping occurs. Fig. 4 is a detail section at the line 4—4 on Fig. 1. Fig. 5 is a detail elevation of a yielding coupling in the clutch-shifting connections. Fig. 6 is a detail front elevation of the hand lever and its connections and contiguous parts. Fig. 7 is a detail section at the line 7—7 on Fig. 3. Fig. 8 is a section at the line 8—8 on Fig. 3. Fig. 9 is a section axial with respect to the conveyer driving shaft through the parts carried thereon. Fig. 10 is a detail section at the line 10—10 on Fig. 9 (showing clutch).

The machine to which this invention is shown applied in the drawings comprises the customary frame, A, mounted upon two traction wheels, B, B, and front carrying wheels, C, C, the entire structure comprising the customary conveyer bottom, D, operated by its drive chains, E, E, which pass about driving sprocket wheels, 1, 1ª, on the conveyer driving shaft, 2, journaled in the frame rearward of the rear axle, B¹, and idle sprocket wheels, 3, 3, which are journaled in brackets, 4, 4, mounted upon the forward side of the sill or bolster, A¹, of the frame, A. The traction wheels, B, B, are mounted on the axle, B¹, in the customary manner, for rotating the axle when the machine travels forward, the particular structure for this purpose not being shown and any familiar construction for the purpose being suitable. On the conveyer driving shaft, 2, there are mounted loose for rotation a sprocket wheel, 5, and a worm wheel, 6, and between them on the shaft, clutch devices hereinafter more particularly described, for engaging either of them with the shaft for rotation.

On the axle, B¹, there is mounted rigidly a sprocket wheel, 7, which is connected by a chain, 8, with the sprocket wheel, 5, on the conveyer driving shaft, 2, causing said sprocket wheel, 5, to be rotated in the same direction as the axle. On the axle there is mounted a beveled gear wheel, 9, having an elongated sleeve hub, 9ª, by which it is journaled in the bracket, A², on the frame, A; and on said frame, A, there is mounted a bracket, A³, in which the worm wheel, 6, is journaled, and which also affords bearing for a longitudinal shaft, 10, having at the forward end a pinion, 10ª, meshing with the beveled gear, 9, and at the rear end a worm, 10ᵇ, engaging the worm wheel, 6, the parts being so disposed that the worm wheel derives motion in the opposite direction from the gear wheel, 9, and axle, B¹, and opposite, therefore, from the sprocket wheel, 5, on the shaft, 2. Feathered on the shaft, B¹, there is a sliding clutch member, 12, which has its ratcheted clutch face, 12ª, facing and engaging the ratcheted or clutch-formed inner end, 9ᵇ, of the hub sleeve of the beveled gear, 9. 13 is a forked shipping lever whose fork ends engage, but with considerable room for play, in the annular groove, 12ᵇ, of the clutch, 12, for sliding the latter on the axle, B¹, to carry the clutch face, 12ª, into and out of engagement with the clutch end, 9ᵇ, of the hub of the gear, 9. The sprocket wheel, 1, faces and has its hub extending into an interiorly ratcheted clutch member, 11, which is rigid with the sprocket wheel, 5, and said sprocket wheel is engaged by a clutch dog, 17, as hereinafter further described, with said clutch member and thereby with said sprocket wheel, 5, for operatively connecting the latter for rotation with the shaft, 2.

Just inside the side bar of the frame, A, on the shaft, 2, there is mounted a flanged collar or disk, 16, rigid with said shaft, carrying a clutch dog, 17, and coöperating with a clutch member, 11ª, which is formed on the inner end of the hub of the gear, 6, for communicating rotary motion from said gear, 6, to the shaft, 2, in the opposite direction from the motion which said shaft may derive from the sprocket wheel, 5. The clutch structure consisting of said housing and coöperating clutch elements, is that which is fully described in my pending application, Serial No. 438,464 filed June 15, 1908 and need not be particularly described herein, further than to point out that it comprises a clutch dog, 17, mounted on the clutch member which is fast on the shaft and normally out of driving engagement with the interiorly ratcheted clutch member, but is adapted to be tripped into engagement with the ratchet thereof by the intrusion of the tripping finger, 20, carried by the shipping sleeve, 21, mounted for sliding on the shaft, 2, between the two clutch devices, and having such a tripping finger at each end for intrusion into the two clutch devices respectively, to trip their respective dogs. This shipping sleeve, 21, has flanges, 21ª, intermediate its ends and spaced apart for the engagement between them of the forked shipping lever, 22, which is fulcrumed at 22ª, on the cross bar, A⁴, of the frame.

Each of the shipping levers, 13 and 22, is a bell crank, and the transversely extending arms, 13ᵇ and 22ᵇ, of said shipping levers are connected by a two-part link, 25—26, whose two parts are connected together for longitudinal diminution of the link, as seen in Fig. 5, a spring, 27, being interposed in their connection to yieldingly resist the diminution of the link. Both shipping levers are operated by one and the same shipping rod, 28, which is supported on the frame extending longitudinally thereof and connected at its rear end by a short link, 28ª, with the link member, 25, such connection being conveniently made at the pivotal connection of said link member with the arm, 13ª, of the shipping lever, 13. At its forward end, the shipping rod, 28, is connected to the lower end of a hand-operated controlling lever, 29, which is fulcrumed on a bracket, 30, mounted at the forward side of the transverse frame sill, A¹, and having at its upper end a notched segment, 31, whose notches are all abrupt shouldered at both sides for positive movement therewith of a detent, 32. This detent is mounted for sliding on the hand lever, 29, and is connected by a link, 33, with a slide, 34, mounted for sliding on the lever, 29, below the fulcrum of said lever. The slide carries at its lower end a stud-and-roll, 36, which overhangs and tracks upon the upper edge of a cam plate, 37, which is rigidly mounted upon a slide bar, 38, said slide bar being mounted for sliding longitudinally of the frame in a hanger, 42, and a bracket arm, 30ª. The cam plate, 37, has its cam track comprising two oppositely inclined slopes, 37ª and 37ᵇ, at an obtuse angle to each other, each terminated by a vertical shoulder, 37ᶜ. The described construction of this cam plate causes it upon the reciprocation of the slide bar, 38, which carries it, to operate the slide, 34, longitudinally of the lever, 29, thrusting it up or letting it down according to the direction of movement of the slide bar, and at the limit of the upward thrust which results from the sliding of the bar, 38, in either direction from middle position shown in Fig. 3, the abrupt shoulder, 37ᶜ, engaging the stud-and-roll, 36, rocks the lever, 29, about its fulcrum, the upward sliding movement which precedes the encounter with the shoulder having lifted the detent, 32, out of the segment notch with which it may have been engaged so that nothing prevents said rocking movement upon such encounter.

The slide bar, 38, at its rear end has a downwardly bent end, 38ª, which stands in the path of the lower ply of the conveyer, D, so as to be encountered by the foremost slat, d, thereof in the forward travel of the lower ply of said conveyer just before the limit of the rearward movement of the upper ply,—carrying the follower board, D¹,—is reached, and such encounter of the slat, d, with the end of the slide, 38, thrusts said slide forward and causes the rear cam slope, 37ᵇ, of the cam plate, 37, to operate for disengaging the detent from the foremost notch of the segment, 31, and immediately afterward, the shoulder, 37ᶜ, encountering the stud-and-roll, 36, rocks the lever, 29, from the position shown in dotted line in Fig. 3 back toward the position shown in full line. The movement thus communicated to the lever, 29, operates the shipping rod, 28, pulling it forward and shifting both the clutch sleeves, 12 and 21, on the axle and on the shaft, 2, respectively, for disengagement, the former from the gear, 29, and the latter from the worm wheel, 6, thus disconnecting the conveyer from the driving train which has been operating to give it its rearward or feeding movement. The conveyer comes to rest upon the disengagement of the train; and the lever, 29, is halted with the detent upheld out of engagement with the segment. The operator may now swing the lever rearward until the stud-and-roll, 36, is above the middle of the cam plate and the detent notches, the notch 31ᶜ, locking the clutch sleeve at middle position so that the conveyer driving shaft, 2, is disengaged from both driving trains.

When the operator desires to connect the conveyer for the return forward movement of its upper ply, he will release the detent from the notch, 31$^c$, by means of the finger lever, 40, and link, 41, and rock the lever rearward until the detent reaches and drops into the rearmost notch, 31$^d$, as shown in Fig. 2, and pulls the shipping rod, 28, forward a distance sufficient for shifting the clutch sleeve, 21, over toward the clutch member, 11, causing the clutch dog therein to be tripped for engaging the sprocket wheel, 1, with the shaft, 2, and thus communicating rotation to the shaft, 2, in the proper direction for returning the conveyer to forward position; that is, in the opposite direction from that in which it was being rotated before the encounter of the slat, $d$, with the slide, 38. A spring, 42$^a$, reacting between a lug, 29$^b$, on the lever, 29, and a stop, 33$^b$, on the detent lifting rod, 33, adds its tension to the weight of the lifting rod and detent for down thrust in the cam plate; and when the lever, 29, is rocked back as described, such thrust acting on the slope of the cam crowds the cam plate forward until the stud-and-roll, 36, rests at the angle or lowest point of the cam, as seen in Fig. 2. Upon the frame, conveniently at the rear side of the forward sill, A$^1$, there is fulcrumed a lever, 43, whose lower end engages loosely a slot, 38$^c$, in the slide, 38, and whose upper end projects past the plane of the upper ply of the conveyer so as to stand in the path of the foremost slat, $d^2$, for encounter therewith, as seen in Fig. 2. Such encounter occurs upon the return or forward movement of the upper ply of the conveyer when the follower board, D$^1$, reaches the position shown in Fig. 2 and rocks the lever, 43, from the position shown in full line in said Fig. 2 to the position shown in dotted line in Fig. 3, sliding the bar, 38, and the cam plate, 37, to the position shown in dotted line in Fig. 3. In the first part of this movement, the rear slope of the cam plate forces the detent directly upward out of engagement with the segment notch, 31$^d$, and the remainder of the movement swings the lever, 29, over to the position shown in full line in Fig. 3, causing the rod, 28, to be thrust rearward, operating the shipping lever, 22, sufficiently for disengaging the shaft, 2, from the sprocket wheel, 5, causing the conveyer to come to rest. The operator may then operate the lever, 29, by hand far enough to bring the stud-and-roll, 36, to the bottom of the cam, the detent at that position dropping into the shallow notch, 31$^b$, and locking the parts in the position of rest of the conveyer. When the operator desires to start the conveyer rearward for its feeding travel, he will rock the lever, 29, farther forward to the position shown in dotted line in Fig. 3, thereby completing the shifting of the clutch devices, 12 and 21, to position for engaging the shaft, 2, with the feeding train of which the beveled gear, 9, is the initial wheel. When this is done, the tension of the spring, 27, added to the weight of the bar, 33, and detent, 32, will operate upon the cam plate by down thrust upon its slope to cause it to move rearward to the position shown in dotted line in Fig. 3, leaving the terminal, 38$^a$, of the bar, 38, exposed in the path of the under ply of the conveyer, so that it will be encountered thereby, as shown in dotted line in Fig. 3, at the close of the feeding or delivering movement of the conveyer for disengaging the driving train, as already described.

The play which is allowed to the fork arms of the shipping lever, 13, in the annular groove, 12$^b$, of the clutch member, 12, permits sufficient movement of the shipping sleeve, 21, to disengage the conveyer driving shaft, 2, from the sprocket wheel, 5, before any movement of the clutch member, 12, is caused. In the continuation of the forward swinging movement of the lever, 29, for engaging the train for giving the conveyer its rearward or delivering movement, if the position of the clutch member, 16, with respect to the engaging end of the clutch dog, 17, happens to be such as to cause the dog to strike on the point of one of the teeth of the clutch member instead of into the recess between two teeth as should happen for perfect engagement, the spring, 27, will be compressed while the bar, 25, is thrust rearward sufficiently for effecting the engagement of the clutch face, 12$^a$, with the clutch end, 9$^b$, of the hub of the gear, 9, and said engagement causing the clutch member, 16, to be rotated will permit the dog to become properly engaged therewith, and such engagement will be caused by the reaction of said spring from the compression, completing the movement of the shipping sleeve, 21. In the reverse action of the clutch-operating rod, 28, which occurs upon the completion of the rearward or delivering movement of the conveyer as described, the first forward pull of said rod will swing the fork arms of the shipping lever freely through the limit of their play in the groove, 12$^b$, of the clutch member, 12, while the shipping lever, 22, is positively operating on the shipping sleeve, 21, for withdrawing the tripping finger, 20, to release the clutch dog, 17, from the clutch member, 16. This release having been effected, the conveyer driving shaft, 2, would be disengaged from the train, and thereby the frictional grip of the ratchets, 12$^a$ and 9$^b$, upon each other will be reduced so that they will be readily disengaged by the further pull of the rod, 28, operating the tripping lever, 13.

In the drawings, there is shown a sprocket wheel, 45, which is designed for operating a rotary distributer of any customary sort, none being shown. This sprocket wheel is engaged with the traction wheel, B, for rotation thereby by sliding on the axle outwardly toward said wheel and disengaged by sliding in the opposite direction, and such sliding is effected by means of a shipper, $42^x$, engaging the hub of the sprocket wheel outside the side bar of the frame, A, and having an arm, $42^y$, which extends past said side bar under the same, having a guide bearing in a bracket, 44, which is mounted on the side bar, and forms also bearings for the axle, $B^1$. The shipper is operated by a spiral-shaped cam, 46, engaging a notch in the arm, $42^y$, of the shipper. A pull rod, 47, is connected to the cam for rocking it over its pivotal support on the bracket, 44, to actuate the shipper. The rod, 47, is connected at its forward end with the lever arm, 48, of a rock shaft, 49, which has a pedal arm, 50, designed to be depressed by the foot of the driver to thrust the rod, 47, rearward. This action rocks the cam in direction for engaging the sprocket wheel, 45, with the traction wheel. On this rod there is mounted for sliding relatively to the portion of the rod which extends therefrom to the spiral cam, an abutment, 51, which projects in the path of the lower ply of the conveyer so as to be encountered by the foremost slat of said ply toward the close of the upper rearward or delivering movement of the upper ply of said conveyer. Such encounter compresses the spring, 52, which yieldingly resists the forward movement of the abutment on the rod, and such yielding permits the continued travel of the conveyer for a short distance while the encounter of the same slat, $d$, with the abutment, $38^a$, of the slide, 38, is effecting the disengagement of the shaft, 2, from the gear, 6. The yieldingness of the abutment, 51, thus insures the conveyer coming to rest and ceasing to feed the material for delivery before the distributer drive wheel, 45, is disengaged from the traction wheel and the distributer brought to rest, and also relieves the strain upon the rod, 47, and cam, 46, which would result from the too sudden application of the force for effecting the disengagement; but especially, this construction insures the complete disengagement of the sprocket wheel, 45, from the traction wheel which would not be produced if the conveyer came to rest before sufficient movement had been given to the rod, 47, to disengage the clutch, $45^a$. This clutch cannot be reëngaged so long as the conveyer stands in the position at which disengagement is effected and the cam, 46, acts as a positive lock as well as a means of shifting the shipper, and prevents reëngagement until the operator depresses the foot lever, 50.

I claim:—

1. In combination with a traveling device, a train by which it is driven; a clutch for engaging it with and disengaging it from such train; a clutch-shifting lever in position to be operated at will; connections therefrom for shifting the clutch; a detent on the lever and an element with which it engages for locking the lever positively against movement in either direction; a detent releaser which actuates the lever by continuation of its detent-releasing movement, and means connected with such detent releaser positioned for actuation by the traveling device in the closing part of its travel.

2. In combination with a traveling device, two trains by which it is driven in opposite directions; a clutch for engaging it with and disengaging it from said trains respectively; a clutch-shifting lever in position to be operated at will; connections therefrom for shifting the clutch; a detent on the lever and an element with which the detent engages for locking the lever positively against movement in either direction; a detent releaser positioned for actuating the lever by continuation of its detent-releasing movement, and means positioned for encounter with the traveling device at the limits of its opposite movements respectively for actuating the detent releaser.

3. In combination with a traveling device, two trains by which it is driven in opposite directions; a clutch for engaging it with and disengaging it from said trains respectively; a clutch-shifting lever in position to be operated at will; connections therefrom for shifting the clutch; a detent and an element with which it engages for locking the lever positively against movement in either direction; a detent releaser mounted for movement in opposite directions, adapted to release the detent by either movement, and positioned for actuating the lever by continuation of its movement in either of said directions after releasing the detent, and means exposed for actuation by the traveling device at the closing part of its opposite movements respectively for actuating the detent releaser oppositely at said closing parts.

4. In combination with a traveling device, a train by which it is driven; a clutch for engaging it with and disengaging it from such train; a clutch-shifting lever in position to be operated at will; connections therefrom for shifting the clutch; a detent and an element with which it engages for locking the lever positively against movement in either direction; a detent-releaser which actuates the lever by continuation of its detent-releasing movement; means mounted for actuation by the traveling device in the closing part of its movement for actuating the detent releaser; means other than said detent-releaser for disengaging the detent to permit the lever to be moved at will, and means by which the lever in its said movement shifts the detent-releaser.

5. In combination with a traveling device, a train by which it is driven; a clutch for engaging it with and disengaging it from such train; a clutch-shifting lever in position to be operated at will; connections therefrom for shifting the clutch; a detent and an element with which it engages for locking the lever positively against movement in either direction; a cam plate and a part operated thereby to release the detent, and means for moving the cam plate comprising an abutment exposed for actuation by the traveling device in the closing part of its travel.

6. In combination with a traveling device, a train by which it is driven; a clutch for engaging it with and disengaging it from such train; a clutch-shifting lever in position to be operated at will; connections therefrom for shifting the clutch; a bar having notches which are abrupt shouldered at both sides; a detent on the lever for engaging the notches of the bar to lock the lever positively against movement in either direction; a movable cam plate and a part operated thereby to lift the detent from the notches; and means for moving the cam-plate comprising an abutment exposed for actuation by the traveling device toward the limit of its travel.

7. In combination with a traveling device, a train by which it is driven; a clutch for engaging it with and disengaging it from such train; a clutch-shifting lever in position to be operated at will; connections therefrom for shifting the clutch; a bar provided with abrupt-shouldered notches; a detent on the lever for engaging the notches to lock the lever positively against movement in either direction; a cam plate and a detent lifter operated thereby for taking the detent out of the notches, said detent lifter being engaged with the lever for swinging the latter; the cam plate having an abutment at the limit of its detent-lifting portion for engaging said detent lifter positively to swing the lever at the limit of the lifting action, and means for moving the cam plate comprising an abutment exposed for actuation by the traveling device toward the limit of its travel.

8. In combination with a traveling device, a train by which it is driven; a clutch for engaging it with and disengaging it from such train; a clutch-shifting lever in position to be operated at will; connections therefrom for shifting the clutch; a detent and an element with which it engages for locking the lever positively against movement in either direction; a cam plate and means for moving it comprising an abutment exposed for actuation by the traveling device in the closing part of its travel; an element mounted for movement longitudinally of the lever for operating the detent, said element being stepped on the cam plate, and a spring which thrusts said element against the cam plate.

9. In combination with a traveling device, a train by which it is driven; a clutch for engaging it with and disengaging it from such train; a clutch-shifting lever in position to be operated at will; connections therefrom for shifting the clutch; a bar having notches which are abrupt-shouldered at both sides; a detent on the lever for engaging said notches to lock the lever positively against movement in both directions; a movable cam plate and a part stepped thereon and operated thereby for lifting the detent from the notches, said detent lifter being engaged with the lever for swinging the latter, the cam plate having an abutment at the limit of its detent-lifting portion for engaging the detent lifter to positively swing the lever at the limit of its lifting action; a spring which thrusts the detent lifter against the cam plate, and means for moving the cam plate comprising an abutment exposed for actuation by the traveling device toward the limit of its travel.

10. In combination with a conveyer, two trains by which it is driven in opposite directions; a clutch for engaging it with and disengaging it from such trains respectively; a clutch-shifting lever in position to be operated at will; connections therefrom for shifting the clutch; a segment along which the lever swings having notches which are abrupt shouldered at both sides; a detent on the lever for engaging the notches to lock the lever positively against movement in either direction, the detent being movable on the lever; a detent lifter mounted for movement along the lever; a cam plate on which the lower end of the detent lifter is stepped, its cam edge comprising two slopes converging downward and an abrupt vertical abutment at the upper end of each slope; a carrier for the cam plate mounted for fore-and-aft movement; and a lever fulcrumed on the frame engaging the cam plate and projecting past the plane of the upper ply of the conveyer, the said carrier having an abutment at its rear end positioned for encounter therewith of the lower ply of the conveyer.

11. In combination with the frame, traction wheels on which it is carried and the axle of such wheels; the conveyer and its driving shaft mounted on the frame; two trains for communicating motion from the axle to the conveyer driving shaft, one of said trains comprising a wheel fast on the axle and a wheel loose on the conveyer driving shaft and power-communicating connections between them; a clutch on the axle for connecting it with the first wheel of the other train, said train also comprising a wheel loose on the conveyer driving shaft; a clutch device mounted for sliding on said shaft between said two wheels loose thereon; shipping levers for operating the clutch devices on the axle and on the conveyer driving shaft respectively; an operating bar connecting them, the shipping device for the axle clutch having a range of play with respect to said clutch in excess of any play of the other shipping lever with respect to its clutch device; a clutch-operating rod for operating both shipping devices, and means exposed for actuation by the conveyer at the closing part of its opposite movements for actuating the operating rod.

In testimony whereof, I have hereunto set my hand, in the presence of two witnesses, at Chicago, Illinois, this 1st day of August, 1908.

JOSEPH BODA.

In the presence of—
CHAS. F. BURTON,
JULIA S. ABBOTT.